United States Patent
Micklish

[11] Patent Number: 5,699,945
[45] Date of Patent: Dec. 23, 1997

[54] SIDE RAIL MOUNTED BICYCLE RACK FOR PICKUP TRUCKS

[76] Inventor: William H. Micklish, 885 Beldon Way, Reno, Nev. 89503

[21] Appl. No.: 725,488

[22] Filed: Oct. 4, 1996

[51] Int. Cl.[6] .................................................. B60R 9/08
[52] U.S. Cl. .................. 224/402; 224/42.26; 224/405; 224/924
[58] Field of Search ........................... 224/405, 403, 224/402, 42.13, 42.16, 924; 296/3

[56] References Cited

U.S. PATENT DOCUMENTS

| | | | |
|---|---|---|---|
| 4,934,572 | 6/1990 | Bowman et al. | 224/403 X |
| 5,092,504 | 3/1992 | Hannes et al. | |
| 5,255,951 | 10/1993 | Moore, III | 296/3 |
| 5,257,728 | 11/1993 | Gibson | 224/405 X |
| 5,303,858 | 4/1994 | Price | 224/405 |
| 5,435,475 | 7/1995 | Hudson et al. | 224/924 |
| 5,476,202 | 12/1995 | Lipp | 224/532 |
| 5,599,053 | 2/1997 | Wilson | 296/3 |

OTHER PUBLICATIONS

Sports Rack Vehicle Outfitter Catalog pp. 18–23, Jul. 1996.
Yakima Catalog pp. 19, 23, Jul. 1996.

*Primary Examiner*—Renee S. Luebke

[57] ABSTRACT

A rack is provided for pickup trucks to mount a bicycle on top of the vertical side rails of the cargo bed. The rack includes a "C" shaped brace that attaches to and reinforces the front rail and side rail of the cargo bed. A diagonal support is attached between the two outer legs of the brace and a vertical support extends upward from the center of the diagonal support. A hollow shaft passes through the upper end of the vertical support and is reinforced with a concentric square tube. A bicycle wheel quick release is attached through the hollow shaft to enable a bicycle front fork to be attached. A channel with a "U" shaped cross section is attached to the top of the side rail at a position to receive the bicycle rear wheel which is secured with a strap.

5 Claims, 4 Drawing Sheets

SIDE RAIL MOUNTED BICYCLE RACK FOR PICKUP TRUCKS

BACKGROUND—FIELD OF INVENTION

This invention relates to bicycle racks, specifically to an improved rack for the transportation of bicycles on pickup trucks.

BACKGROUND—DISCUSSION OF PRIOR ART

Various designs have been provided to transport bicycles on a pickup truck but each of them have distinct disadvantages that are resolved by the rack of the present invention. Many of the racks are described in U.S. Patents, the most pertinent of which are described below. U.S. Pat. No. 5,092,504 describes a common rack design in which a bar is placed across the cargo bed of a pickup truck. Bicycles are attached to this bar and essentially fill the cargo bed preventing its use for the carriage of other large items and hindering rearward view from the vehicle cab. The bicycles are exposed to potential damage during transport by other objects that may be in the bed. To mount bicycles in this rack they must be lifted over the cargo bed side rails and awkwardly lowered into the bed or a person must enter the bed. To fully access the cargo bed when bicycles are not carried this type of rack must be removed and stored elsewhere.

U.S. Pat. No. 5,476,202 describes a bicycle rack which attaches to a receiver hitch and may be used on pickup trucks. The position of the bicycles at the rear of the vehicle restricts access to the cargo tailgate as well as exposing the bicycles to serious damage in minor rear end collisions. The necessity of a receiver hitch imposes significant additional cost and precludes the towing of trailers when the rack is installed. To gain unencumbered use of the bed, tailgate and hitch the rack must be removed and stored elsewhere.

U.S. Pat. No. 5,303,858 describes a cargo rack for pickup trucks in which the bicycles are carried outside of the cargo area on the sides of the vehicle. The position of the bicycles poses a hazard because the pedals and handlebars stick out further than a standard side view mirror and may strike other objects. For lateral support this rack includes a crossbeam that restricts carriage of large items in the cargo area when the rack is in use. When not in use this crossbeam must be folded adding to the complexity and cost of the rack. The configuration of this rack is such that several versions of it would need to be manufactured to fit a range of pickups because cargo bed size varies by vehicle make and model.

Bicycle magazines and catalogs show generic bike "hold downs" that may be attached to a pickup truck for the transport of bicycles in the cargo area. These hold downs suffer similar deficiencies to those described for U.S. Pat. No. 5,092,504 above. In addition, if permanently mounted to the cargo bed floor they interfere with other cargo when bicycles are not being transported.

OBJECTS AND ADVANTAGES

Accordingly, several objects and advantages of the present invention are:

(a) to provide a bicycle rack for pickup trucks that does not compromise use of the truck bed for other cargo when bicycles are being transported;

(b) to provide a bicycle rack for pickup trucks that may be permanently attached to a truck without the need for removal, adjustment or folding to fully use the cargo area;

(c) to provide a bicycle rack for pickup trucks that reduces the risk of bicycle damage due to contact with other objects during transport;

(d) to provide a bicycle rack for pickup trucks that does not restrict rearward visibility;

(e) to provide a bicycle rack for pickup trucks that allows ease of bicycle loading and unloading;

(f) to provide a bicycle rack for pickup trucks that will fit the majority of vehicle models without adjustment, modification or variation in manufacture.

Further objects and advantages are to provide a rack which will effectively display a mounted bicycle, which may be produced in various colors to enhance truck appearance, which is compatible with truck bed liners and which will be easy and inexpensive to manufacture. Still further objects and advantages will become apparent from a consideration of the ensuing description and drawings.

SUMMARY OF THE INVENTION

This invention provides a bicycle rack which allows the carriage of bicycles on top of the vertical side rails of a pickup truck bed. In its preferred embodiment, the rack of this invention comprises a bed brace which attaches to the front rail and one of the side rails of a pickup truck bed. A diagonal tube connects the two end legs of the bed brace and supports a vertical tube with conventional provisions to attach a bicycle front fork. A conventional "U" shaped channel is attached to the top of the truck side rail to secure the rear bicycle wheel.

DRAWING FIGURES

FIG. 1: perspective view of my invention.

FIG. 2: top view.

FIG. 3: side view of bicycle fork support and securement means.

FIG. 4: perspective view of rear tire attachment means.

FIG. 5: top view of rack installation in left front corner of pickup truck bed.

FIG. 6: side view of bicycle mounted on pickup.

FIG. 7: rear view of two bicycles mounted on pickup.

DESCRIPTION OF A PREFERRED EMBODIMENT

Figure 1:
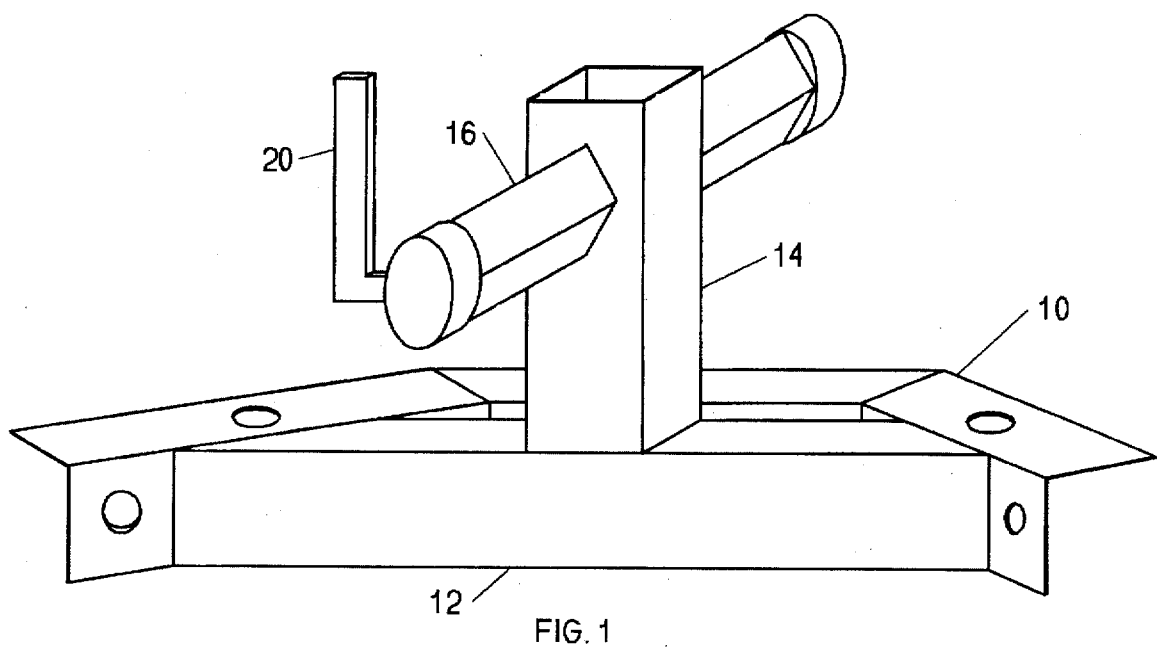
Figure 2:
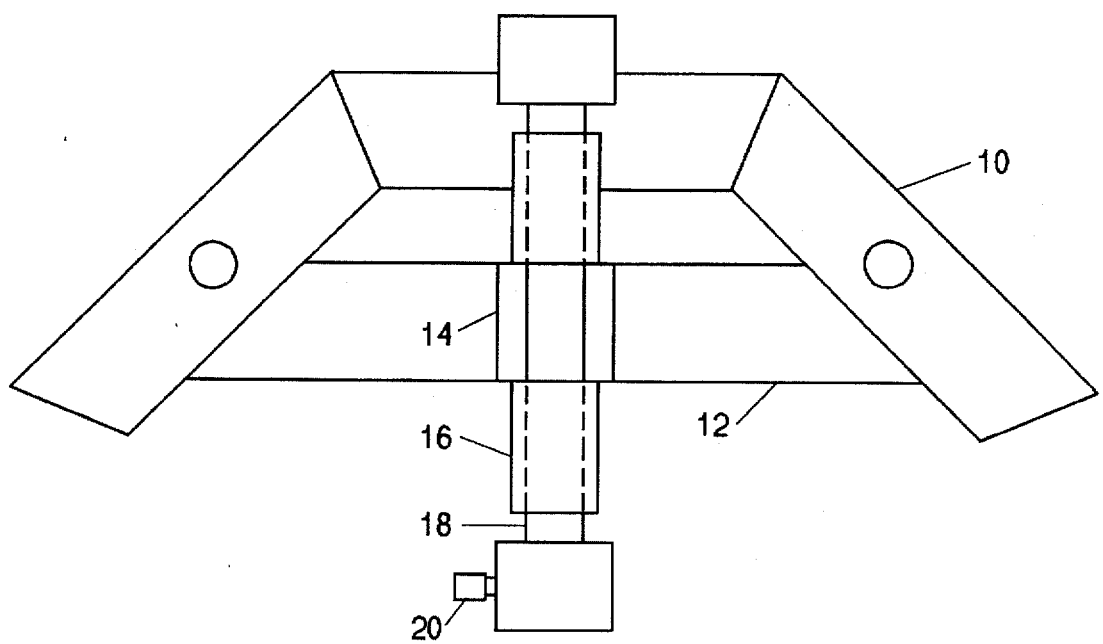

FIG. 1 shows a perspective view of my rack. The rack comprises a truck bed brace 10 constructed from angle steel of "L" shape cross section. Three equal pieces of angle steel with ends cut to meet at 45 degree angles are welded together to form a shallow "C" shape as seen from above as shown in FIG. 2. Holes are drilled in the end legs of truck bed brace 10 for attachment purposes. A diagonal support 12 of square tubular steel with ends cut at 45 degrees is welded to the two end legs of truck bed brace 10.

Figure 3:
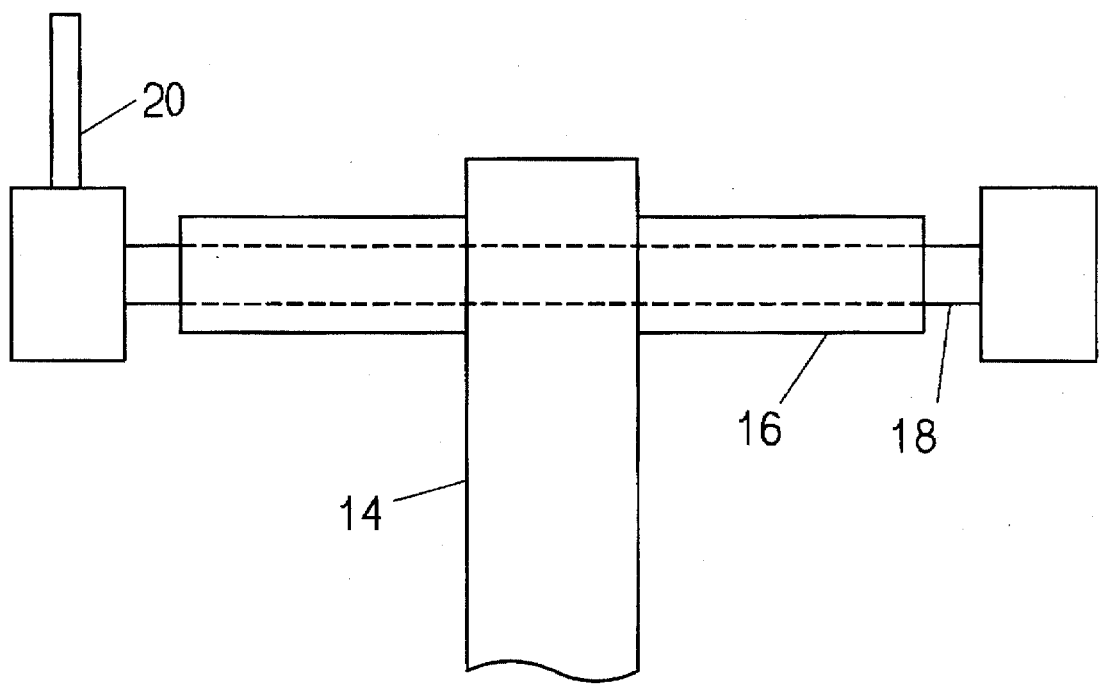

A vertical support 14, also of square tubular steel, is welded to the center of diagonal support 12 such that it extends orthogonally from the plane defined by the tops of truck bed brace 10 and diagonal support 12. Near the top end of vertical support 14, a hole is drilled through the two opposite sides that are parallel to the long axis of diagonal support 12. A fork support 16 comprises two equal pieces of square tubular steel of smaller cross section welded to vertical support 14 such that a hollow shaft 18 may pass concentrically through them and the hole in vertical support 14 as shown in FIG. 3. A conventional cam operated quick release 20 is attached through hollow shaft 18.

Figure 4:
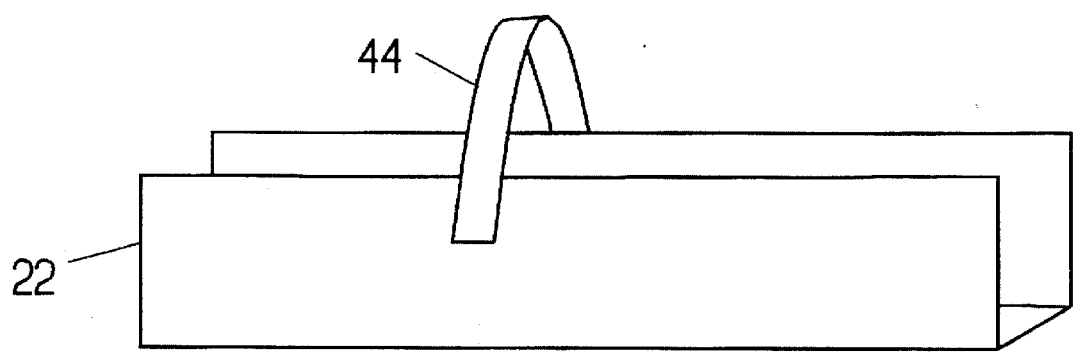

A conventional rear tire attachment 22 comprises a length of metal channel of substantially "U" shape cross section with provision for a conventional strap 44 as shown in FIG. 4.

Operation of Invention

Figure 5:
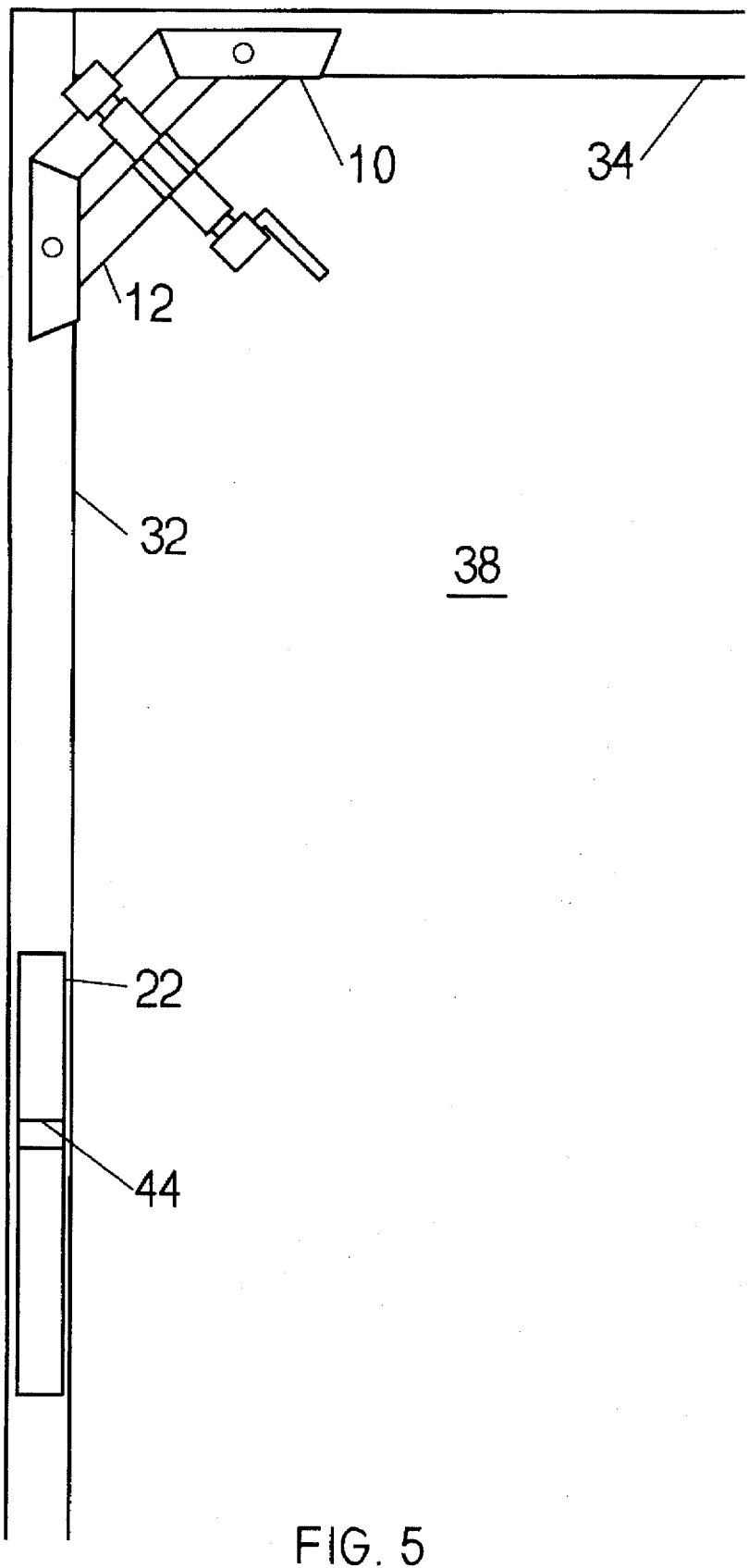

FIG. 5 shows a partial representation of a pickup truck bed 38 with the rack mounted in the left front corner such that the horizontal portion of the outer legs of truck bed brace 10 rest on top of bed side rail 32 and bed front rail 34. Alternatively, the rack may be mounted in the right front corner of a pickup truck bed simply by rotating it 90 degrees clockwise as viewed from the top. Conventional fasteners are used in the holes on truck bed brace 10 to attach the rack to the top and side of bed side rail 32 and bed front rail 34. A conventional rear tire attachment 22 is mounted on bed side rail 32 at a point to receive a bicycle rear wheel 40 as shown in FIG. 6.

Figure 6:
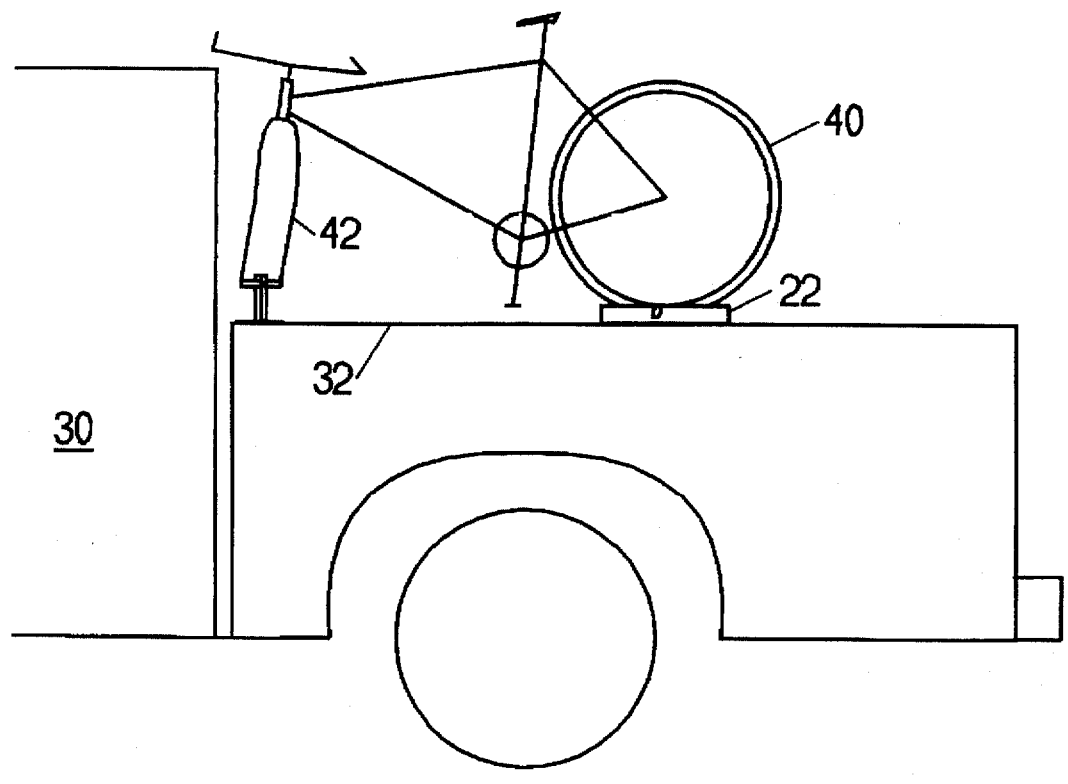

The front wheel of a bicycle is removed and a bicycle front fork 42 is turned at a 45 degree angle to the bicycle frame and placed such that it rests on hollow shaft 18 and rear wheel 40 rests in the channel of rear tire attachment 22 as shown in FIG. 6. Quick release 20 is tightened on front fork 42 and a conventional strap 44 is used to secure rear wheel 40.

Figure 7:
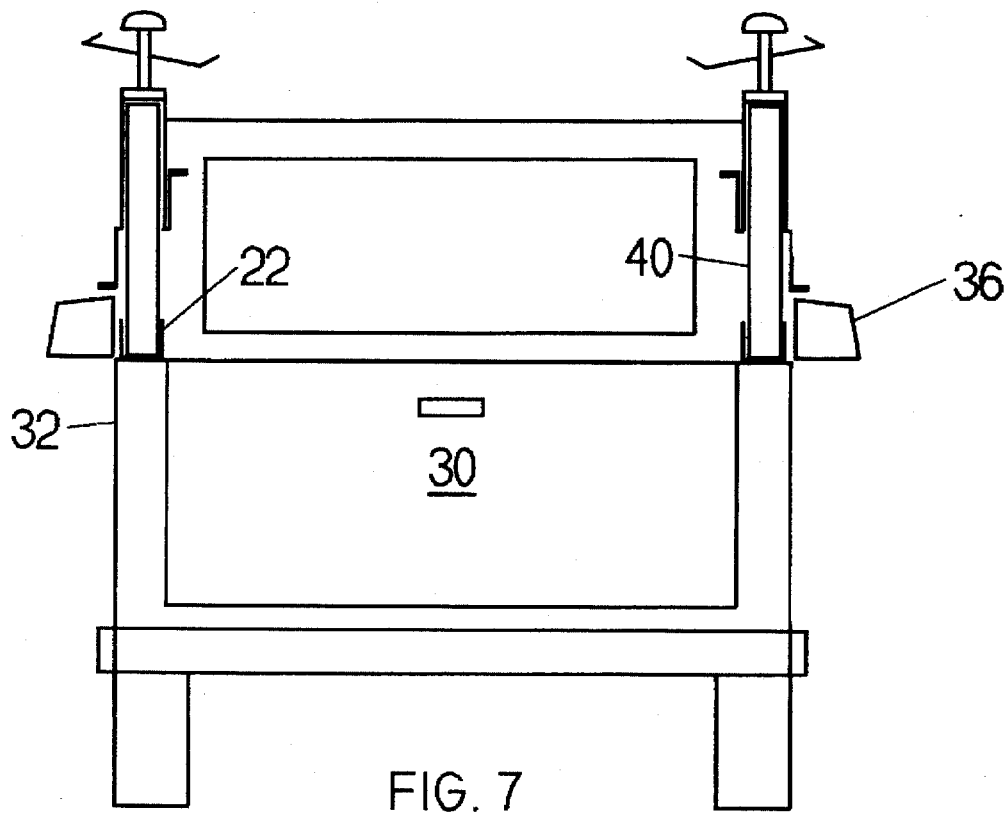

FIG. 7 shows the configuration from the rear of two bicycles mounted on a pickup truck 30 using the rack of this invention. The positioning of the bicycle on top of side rail 32 and the configuration of the rack of this invention enable the entire bicycle to remain within the lateral dimension of a standard side mirror 36 minimizing the chance of collision with objects outside the bed while maximizing available space in the truck bed for the transport of other cargo.

Conclusions, Ramifications, and Scope

Accordingly, the reader will see that the rack of this invention can be used to safely and conveniently transport bicycles on top of the side rail of a pickup truck bed without compromising the use of the truck bed for the transport of other cargo. In addition, it may be permanently attached to the truck bed without the need for removal or adjustment to allow full use of the bed whether or not bicycles are being transported. Furthermore the rack has additional advantages in that:

- it positions the bicycles such that risk of contact with other objects in or out of the bed is minimized;
- it does not restrict rearward visibility from the truck cab;
- it provides for ease of loading and unloading of bicycles;
- it will fit virtually every make and model of pickup truck without adjustment or modification including those with bed liners;
- it provides a rack that is inexpensive to manufacture due to its size and simplicity.

Although the description above contains many specificities, these should not be construed as limiting the scope of the invention but as merely providing an illustration of one preferred embodiment of this invention which may be embodied in other specific structures. For example:

- the material of construction could be aluminum, titanium, plastic, composite, etc. or a combination of such materials;
- the parts could be forged, cast, stamped etc.;
- bed brace 10 could be constructed from tube, flat material, etc., it could have more or fewer than three pieces, the angles between its pieces could be greater or less than 45 degrees and it could be constructed as a smooth curve rather than jointed;
- diagonal support 12 could be made from round tube, flat material, angle, etc., its ends could be cut at other than 45 degrees, and it could be eliminated and vertical support 14 could be directly attached to bed brace 10;
- diagonal support 12 could be attached directly to the front and side rails thereby incorporating its function with the bed brace;
- vertical support 14 could be made from round tube, flat material, angle, etc. and it could be placed at other than a 90 degree angle to diagonal support 12;
- fork support 16 could be made from round tube, flat material, angle, etc. and it could be placed at other than a 90 degree angle to diagonal support 12;
- hollow shaft 18 could be replaced with a solid shaft that incorporates the quick release mechanism.
- the rack could be adapted to attach to a tool box and the side rail rather than the front and side rails;
- a conventional clamping system could be used to make the rack removable rather than permanently attached.

Thus the scope of the invention should be determined by the appended claims and their legal equivalents, rather than by the examples given.

I claim:

1. A rack for securing a bicycle on top of side rails of a pickup truck bed comprising:

(a) at least one brace member adapted to engage a front rail and a side rail of said pickup truck bed, (b) a support member attached to said brace member, (c) means to receive and secure a bicycle front fork attached to said support member, (d) a substantially U shaped channel attached to the top of said side rail with means to secure a bicycle rear wheel in said channel, whereby said bicycle may be conveniently and safely transported without hindering the use of the pickup truck bed to transport other materials.

2. A rack according to claim 1 wherein said support member is attached such that said bicycle front fork is rotated at an angle when attached to said rack whereby clearance is provided between said bicycle and objects outside of said pickup truck bed.

3. A rack for securing a bicycle on top of side rails of a pickup truck bed comprising:

(a) a brace member having at least two members or legs, adapted to engage a front rail and a side rail of said pickup truck bed, (b) at least one substantially diagonal support member extending between said legs, (c) a substantially vertical support member extending above said diagonal support member with means to receive and secure a bicycle front fork attached to said vertical support member, whereby said bicycle may be conveniently and safely transported without hindering the use of the pickup truck bed to transport other materials.

4. A rack according to claim 3 wherein a substantially U shaped channel is attached to the top of said side rail and means are provided to secure a bicycle rear wheel in said channel.

5. A rack according to claim 3 wherein said vertical support member is attached such that said bicycle front fork is rotated at an angle when attached to said rack whereby clearance is provided between said bicycle and objects outside of said pickup truck bed.

* * * * *